US012168464B2

United States Patent
Liu et al.

(10) Patent No.: US 12,168,464 B2
(45) Date of Patent: Dec. 17, 2024

(54) VEHICLE SAFETY OPERATION MANAGER FOR DRIVER ASSISTANCE FUNCTIONS

(71) Applicant: TOYOTA RESEARCH INSTITUTE, INC., Los Altos, CA (US)

(72) Inventors: Yiting Liu, Los Altos, CA (US);
Hirofumi Yamamoto, Los Altos, CA (US); Chen Bao, Los Altos, CA (US);
Thomas Johnston, Los Altos, CA (US);
Kazunori Nimura, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 337 days.

(21) Appl. No.: 17/714,945

(22) Filed: Apr. 6, 2022

(65) Prior Publication Data
US 2023/0322273 A1    Oct. 12, 2023

(51) Int. Cl.
*B60W 60/00* (2020.01)
*B60W 30/02* (2012.01)
*B60W 30/10* (2006.01)
*B60W 30/14* (2006.01)
*B60W 50/14* (2020.01)

(52) U.S. Cl.
CPC ........ *B60W 60/0061* (2020.02); *B60W 30/02* (2013.01); *B60W 30/10* (2013.01); *B60W 30/14* (2013.01); *B60W 50/14* (2013.01); *B60W 60/0015* (2020.02); *B60W 2720/10* (2013.01)

(58) Field of Classification Search
CPC .. B60W 60/0061; B60W 30/02; B60W 30/10; B60W 30/14; B60W 50/14; B60W 60/0015; B60W 2720/10; B60W 50/12; B60W 60/0016; B60W 2420/403; B60W 2420/408; B60W 60/0059; B60W 60/0055
See application file for complete search history.

(56) References Cited

U.S. PATENT DOCUMENTS

| | | | |
|---|---|---|---|
| 2014/0156134 A1* | 6/2014 | Cullinane | G05D 1/0212 701/23 |
| 2014/0249722 A1 | 9/2014 | Hegemann et al. | |
| 2016/0303972 A1* | 10/2016 | Kühne | B60W 60/0053 |
| 2017/0123434 A1 | 5/2017 | Urano et al. | |
| 2017/0129487 A1* | 5/2017 | Wulf | B60W 30/09 |

(Continued)

FOREIGN PATENT DOCUMENTS

| CN | 109117709 B | 1/2019 |
|---|---|---|
| CN | 110316195 A | 10/2019 |

(Continued)

*Primary Examiner* — Frederick M Brushaber
(74) *Attorney, Agent, or Firm* — Seyfarth Shaw LLP

(57) ABSTRACT

A method for managing autonomous operation of a vehicle includes detecting, while the vehicle is operating in an autonomous mode, an assistance condition that triggers activation of an assistance component of a set of assistance components associated with a driver assistance system. The method also includes determining whether the operation of the vehicle in the autonomous mode satisfies a safety condition associated with the assistance component. The method further includes adjusting an activation signal that triggers the activation of the assistance component based on determining the operation of the vehicle in the autonomous mode satisfies the safety condition.

20 Claims, 5 Drawing Sheets

(56) References Cited

U.S. PATENT DOCUMENTS

| | | |
|---|---|---|
| 2019/0300013 A1 | 10/2019 | Shiraishi et al. |
| 2020/0070661 A1* | 3/2020 | Akuzawa .............. B60L 3/0023 |
| 2020/0198660 A1 | 6/2020 | Bellet |
| 2023/0286500 A1* | 9/2023 | Styles ........................ G06T 7/73 |

FOREIGN PATENT DOCUMENTS

| | | | |
|---|---|---|---|
| DE | 102014220308 A1 | 6/2015 | |
| EP | 3158392 B1 * | 3/2020 | ............. B60K 28/02 |
| EP | 3786854 A1 * | 3/2021 | ............... G06N 3/08 |

* cited by examiner

VEHICLE SAFETY OPERATION MANAGER FOR DRIVER ASSISTANCE FUNCTIONS

BACKGROUND

Field

Certain aspects of the present disclosure generally relate to controlling an autonomous operation mode of a vehicle and, more particularly, to a system and method for preventing an unnecessary disengagement of an autonomous operating mode based on an engagement of a driver assistance function.

Background

A conventional manually operated vehicle may include a driver assistance system, such as an advanced driver assistance system (ADAS), that includes one or more assistance components, such as, for example, traction control, automatic braking, automatic cruise control, and/or collision warning. In some examples, these conventional manually operated vehicles may be retrofitted with an autonomous driving system. Conventional driver assistance system, such as an OEM ADAS, may be unaware that an autonomous driving (AD) system is potentially controlling the vehicle.

In some examples, the autonomous driving system may disengage an autonomous mode to allow a human occupant to take control. In some such examples, the autonomous driving system may disengage the autonomous mode based on a human occupant providing an input at one or more control components of the vehicle, such as the brakes, the throttle, or the steering. In other examples, autonomous driving systems may disengage the autonomous mode in response to an activation of one or more assistance components of a driver assistance system. In some examples, the driver assistance system features may be triggered in a condition that may be within the autonomous driving system's envelope of control. In such examples, canceling the autonomous mode may negatively impact the autonomous driving system.

SUMMARY

In one aspect of the present disclosure, a method for managing autonomous operation of a vehicle includes detecting, while the vehicle is operating in an autonomous mode, an assistance condition that triggers activation of an assistance component of a set of assistance components associated with a driver assistance system. The method further includes determining whether the vehicle can satisfy a safety condition associated with the assistance component while operating in the autonomous mode without activation of the assistance component. The method still further includes adjusting an activation signal that triggers the activation of the assistance component based on determining the vehicle can satisfy the safety condition.

Another aspect of the present disclosure is directed to an apparatus including means for detecting, while the vehicle is operating in an autonomous mode, an assistance condition that triggers activation of an assistance component of a set of assistance components associated with a driver assistance system. The apparatus further includes means for determining whether the vehicle can satisfy a safety condition associated with the assistance component while operating in the autonomous mode without activation of the assistance component. The apparatus still further includes means for adjusting an activation signal that triggers the activation of the assistance component based on determining the vehicle can satisfy the safety condition.

In another aspect of the present disclosure, a non-transitory computer-readable medium with non-transitory program code recorded thereon is disclosed. The program code is executed by a processor and includes program code to detect, while the vehicle is operating in an autonomous mode, an assistance condition that triggers activation of an assistance component of a set of assistance components associated with a driver assistance system. The program code further includes program code to determine whether the vehicle can satisfy a safety condition associated with the assistance component while operating in the autonomous mode without activation of the assistance component. The program code still further includes program code to adjust an activation signal that triggers the activation of the assistance component based on determining the vehicle can satisfy the safety condition.

Another aspect of the present disclosure is directed to an apparatus having a processor, and a memory coupled with the processor and storing instructions operable, when executed by the processor, to cause the apparatus to detect, while the vehicle is operating in an autonomous mode, an assistance condition that triggers activation of an assistance component of a set of assistance components associated with a driver assistance system. Execution of the instructions further cause the apparatus to determine whether the vehicle can satisfy a safety condition associated with the assistance component while operating in the autonomous mode without activation of the assistance component. Execution of the instructions also cause the apparatus to adjust an activation signal that triggers the activation of the assistance component based on determining the vehicle can satisfy the safety condition.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
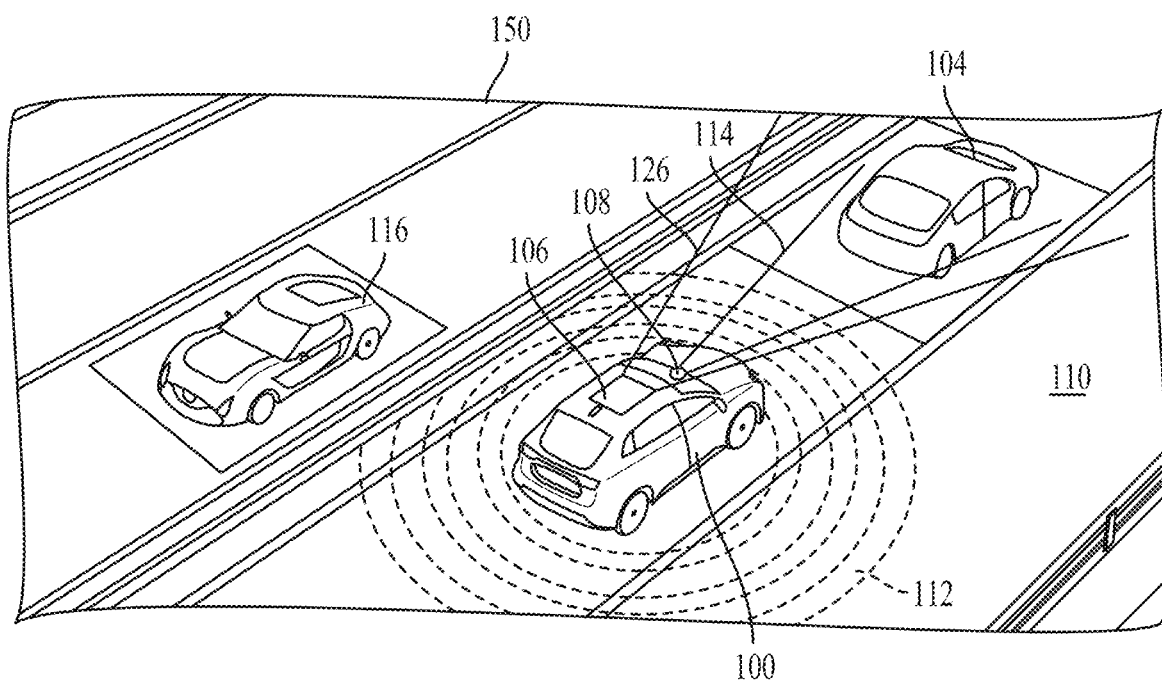
FIGS. 1A and 1B are diagrams illustrating examples of a vehicle, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As discussed, a conventional manually operated vehicle may include a driver assistance system that includes one or more assistance components, such as, for example, traction control, automatic braking, automatic cruise control, and/or collision warning. In some examples, the conventional manually operated vehicles may be retrofitted with an autonomous driving system. In such examples, the vehicle may still include the driver assistance system. The driver assistance system of the conventional manually operated vehicle may be referred to as a legacy driver assistance system or an original equipment manufacturer (OEM) driver assistance system.

After being retrofitted with the autonomous driving system, the vehicle may operate in one of an autonomous mode, a manual mode, or a semi-autonomous mode. In the manual mode, a human driver manually operates (e.g., controls) the vehicle without any intervention from an assistance system. In the autonomous mode, an autonomous driving system operates the vehicle without human intervention. In the semi-autonomous mode, the human may operate the vehicle, and the autonomous control system may override or assist the human. For example, the autonomous control system may override the human to prevent a collision or to obey one or more traffic rules.

In some scenarios, when one or more safety conditions are satisfied, the assistance components associated with the legacy driver assistance system may provide added safety for a vehicle operating in an autonomous mode. The safety conditions may also be referred to as activation conditions or assistance conditions. Such conditions are examples of a condition that may trigger activation of an assistance component. Specifically, the activation may be triggered by an activation signal that is generated by one or more components of a vehicle.

In some examples, each assistance component may be associated with a safe operation condition. The activation of an assistance component may satisfy the safe operation condition. For example, maintaining traction and/or operating within a vehicle lane may be one or more safe operation conditions associated with a traction control component. In this example, the traction control component may be activated to maintain the vehicle's traction and/or maintain operation of the vehicle within a current lane.

In some other scenarios, activation of the assistance components may be unnecessary when the vehicle operates in the autonomous mode because features of the driver assistance system may be integrated with the autonomous driving system, such that the autonomous driving system may maintain safe operation of the vehicle. That is, in some such examples, the vehicle may independently satisfy the one or more safe operation conditions associated with the traction control component while operating in the autonomous mode. As an example, the autonomous driving system may be configured to maintain the vehicle's traction and/or maintain operation of the vehicle within the current lane without activation (e.g., assistance) from the traction control component. In such an example, the assistance component may not provide useful assistance to the autonomous driving system. Additionally, the assistance component may interfere with the autonomous operation of the vehicle.

In some examples, while the vehicle is operating in an autonomous mode, the vehicle or an autonomous driving system may detect an assistance condition that triggers activation of a traction control component. As discussed, the assistance condition for the traction control component may be a steering wheel angle equal to or greater than an angle threshold and/or the vehicle acceleration exceeding an acceleration threshold. Based on detecting the assistance condition, the autonomous driving system may whether the vehicle can satisfy a safety condition associated with the assistance component while operating in the autonomous mode without activation of the assistance component. In some such examples, the autonomous driving system may adjust the activation signal that triggers the activation of the assistance component based on determining the vehicle can satisfy the safety condition. Additionally, or alternatively, the autonomous driving system may impose a preventive maneuver to keep the vehicle within safety limits (e.g., satisfying the safety condition). Adjusting the activation signal may include suppressing or modifying the activation signal, such that the assistance component does not activate.

In some examples, the autonomous driving system may disengage an autonomous mode to allow a human occupant to control the vehicle in a manual mode or a semi-autonomous mode. In some such examples, the autonomous driving system may switch from the autonomous mode to the manual mode, or semi-autonomous mode, in response to the human occupant engaging one or more control components to control an action of the vehicle. The action may include, for example, acceleration, deceleration, and/or steering. The one or more control components may, for example, include the vehicle's brakes, steering, and/or throttle. In the present application, switching from the autonomous mode to the manual mode may be an example of disengaging the autonomous driving system.

Additionally, in some examples, while the vehicle is operating in the autonomous mode, the legacy driver assistance system may activate one or more assistance components when one or more activation conditions are satisfied. In such examples, the autonomous driving system may disengage the autonomous mode based on the activation of the one or more assistance components. A traction control component (e.g., legacy traction control system) may be an example of an assistance component. In such examples, the legacy driver assistance system may activate the traction control component when the steering wheel and/or the vehicle acceleration exceeds a threshold value. For example, the legacy driver assistance system may activate the traction control component when a steering wheel is fully turned in one direction and the vehicle accelerates, from a standstill, while maintaining a speed that is less than a speed threshold. The traction control component may assist a human driver when the vehicle is operated in the manual mode. However, the traction control component may not provide useful assistance when the vehicle is operating in the autonomous mode. Therefore, the activation of the traction control component may be an unintended result of the autonomous operation of the vehicle satisfying each activation condition of a set of activation conditions associated with the traction control component.

In some examples, unintended disengagement during a large steering angle, especially while accelerating, may result in vehicle oversteer and an unintended lane departure. In some such examples, the occupant may be unable to control the vehicle once the autonomous mode is disengaged. For example, the occupant may be a minor and unable to operate the vehicle. As another example, the occupant may be asleep while the vehicle is operating in the autonomous mode and may be unable to control the vehicle when the autonomous driving system disengages.

Still, in some examples, it may be necessary to disengage the autonomous driving system based on one or more triggers (e.g., activation conditions) being satisfied. In such examples, the vehicle may be in danger and activation of an assistance component may prevent damage to the vehicle, the occupant, and/or other vehicles. As an example, due to failure of one or more sensors, the steering wheel may be fully turned and the vehicle accelerates, from a standstill, at a speed that is greater than a speed threshold. In such examples, it may be necessary to activate the traction control component and disengage the autonomous driving system.

Various aspects of the present disclosure are directed to preventing unintended (e.g., unnecessary) disengagement of the autonomous mode based on activation of an assistance component of a legacy driver assistance system. In such aspects, disengagement of the autonomous mode may be unnecessary when the vehicle can satisfy a safety condition associated with the assistance component while operating in the autonomous mode without activation of the assistance component. Some aspects more specifically relate to masking (e.g., modifying or suppressing) an activation signal associated with the legacy driver assistance system based on determining the vehicle can satisfy the safety condition while operating in an autonomous mode. The autonomous driving system may be configured to control the vehicle to safely operate in conditions that triggered activation of an assistance components. Additionally, or alternatively, the autonomous driving system may impose safety procedures to safely operate the vehicle in the conditions that triggered activation of an assistance components.

Particular aspects of the subject matter described in this disclosure may be implemented to realize one or more of the following potential advantages. In some examples, unintended disengagement of an autonomous mode may be prevented by suppressing an activation signal associated with the legacy driver assistance system based on one or more conditions being satisfied.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. In some examples, the information obtained from the sensors 106, 108 may identify whether the vehicle 100 is at an interaction or a crosswalk. Additionally, or alternatively, the information obtained from the sensors 106, 108 may identify whether one or more dynamic objects, such as pedestrians, are near the vehicle 100.

Figure 1B:
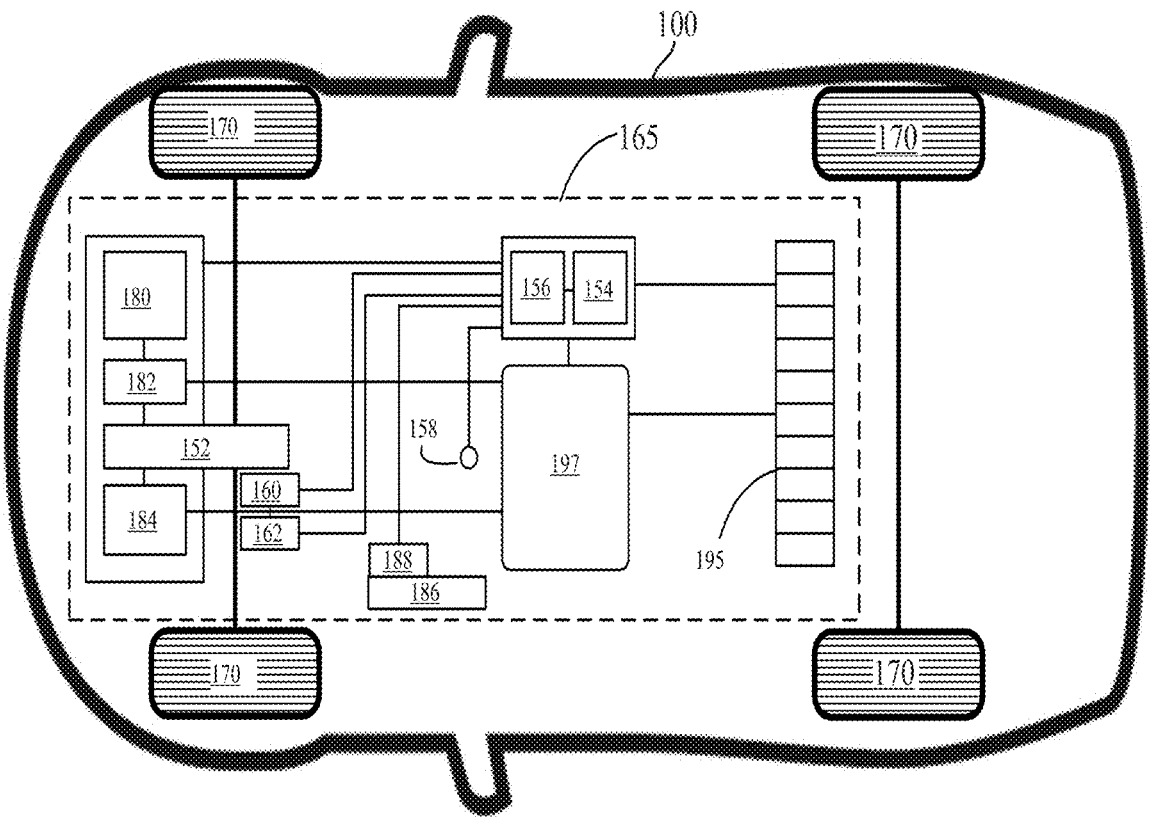

FIG. 1B is a diagram illustrating an example the vehicle 100 in which various aspects of the present disclosure may be implemented. It should be understood that various aspects of the present disclosure may be directed to an autonomous vehicle. The autonomous vehicle may include be an internal combustion engine (ICE) vehicle, fully electric vehicle (EVs), or another type of vehicle. The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 100 may operate in one of an autonomous mode, a manual mode or a semi-autonomous mode. In the manual mode, a human driver manually operates (e.g., controls) the vehicle 100. In the autonomous mode, an autonomous control system (e.g., autonomous driving system) operates the vehicle 100 without human intervention. In the semi-autonomous mode, the human may operate the vehicle 100, and the autonomous control system may override or assist the human. For example, the autonomous control system may override the human to prevent a collision or to obey one or more traffic rules.

As discussed, various aspects of the present disclosure are directed to preventing unintended disengagement of the autonomous mode based on activation of an assistance component associated with the legacy driver assistance system. Some aspects more specifically relate to suppressing an activation signal for an assistance component. The activation signal may be generated by the legacy driver assistance system based on activation conditions associated with the assistance component being satisfied. In some examples, the autonomous driving system may monitor various components of the vehicle to detect an assistance condition that triggers activation of an assistance component of a set of assistance components associated with a driver assistance system. In the current disclosure, the assistance condition may trigger activation of one or more assistance components of a set of assistance components. For ease of explanation, various aspects will be discussed with regard to triggering activation of one assistance component of the set of assistance components. Still, as discussed, in some aspects, the assistance condition may trigger activation of one or more assistance components of the set of assistance components. In such examples, activation of an assistance component may be unnecessary while the vehicle is operating in an autonomous mode because the autonomous driving system may be able to handle a scenario associated with the activation condition. That is, the vehicle can satisfy a safety condition associated with the assistance component while operating in the autonomous mode without activation of the assistance component. Additionally, the autonomous driving system may act fast (e.g., less response time) in comparison to human drivers. Therefore, the autonomous driving system may maintain safe driving conditions in a scenario associated with the activation condition. Still, activation of the assistance component may be necessary for safety when the assistance condition is satisfied while the vehicle is operating in a manual mode or semi-autonomous mode.

In some implementations, an autonomous driving system may identify one or more assistance conditions (e.g., a set of assistance conditions) for each assistance component associated with a legacy driver assistance system. The one or more assistance conditions may be based on human observations of situations that cause disengagement of the autonomous mode based on activation of one or more assistance components associated with the one or more assistance conditions. In such examples, activation of the one or more assistance components based on the one or more assistance conditions being satisfied may be unnecessary when the vehicle is operating in the autonomous mode. Still, as discussed, there may be situations where activation of one or more assistance components may improve overall safety. Therefore, aspects of the present disclosure distinguish scenarios where activation of one or more assistance components may improve safety.

In some examples, a traction control component of the legacy driver assistance system may be activated when a steering wheel of the vehicle is fully turned in one direction and a vehicle accelerates from a standstill. As discussed, activation of the traction control component may disengage the autonomous mode. In such examples, when an activation signal for the traction control component is generated, the autonomous driving system may determine whether all false-positive conditions associated with the traction control component are satisfied. Activation of the traction control component may be unnecessary if one or more safety conditions associated with the traction control component are satisfied by the autonomous driving system. Specifically, when the vehicle is operating in the autonomous mode, the traction control component may be unnecessary because the functions of the autonomous mode may safely control the vehicle without the assistance of the traction control component. Alternatively, activation of the traction control component may improve safety if one or more safety conditions associated with the traction control component cannot be satisfied by the autonomous driving system.

In some such examples, the assistance conditions may include the steering wheel being turned at an angle that is greater than or equal to a threshold and a speed of the vehicle being less than a threshold as the vehicle accelerates from a standstill. In these examples, activation of the traction control component may be unnecessary when all of the safety conditions associated with the traction control component can be satisfied while the vehicle operates in an autonomous mode. In some implementations, the activation signal associated with the traction control component may be masked when all of the safety conditions can be satisfied by the autonomous driving system.

Alternatively, activation of the traction control component may improve safety when the autonomous driving system cannot satisfy all of the safety conditions. In some examples, the autonomous driving system may not satisfy one or more safety conditions when the steering wheel is turned at an angle that is less than the angle threshold and/or the speed of the vehicle is greater than the speed threshold as the vehicle accelerates from the standstill. In such examples, the autonomous mode may be disengaged based on the activation of the traction control component.

Various examples of the present disclosure are directed to the traction control component. Aspects of the present disclosure are not limited to the traction control component, as other assistance components are contemplated. Each assistance component may be associated with one or more false-positive conditions.

As discussed, one or more assistance conditions associated with the traction control component may include a first condition that the vehicle moves from a standstill, a second condition that the steering wheel is at a particular angle or range of angles, such as equal to or greater than 200 degrees, and a third condition that the vehicle speed is less than a threshold, such as 14.4 km/h when moving from the standstill. In some such examples, a fourth condition may be specified that a traction control warning is activated for a specific time period, such as less than two seconds. In such examples, the traction control component may be activated if one or more of the activation conditions are satisfied. In some examples, the autonomous driving system may suppress an activation signal associated with the traction control component if a safety condition associated with the traction control component may be satisfied while the vehicle operates in an autonomous mode. The activation signal may be suppressed (e.g., masked) to prevent activation of the traction control component. One or more sensors integrated with the vehicle, and working in conjunction with the autonomous driving system, may determine whether each activation condition is satisfied.

In some examples, suppressing an activation signal may change a value of the activation signal. As an example, if a value of the activation signal is one, the value of the masked activation signal may be zero or a floating-point value, such as 0.236. Aspects of the present disclosure are not limited to the set of activation conditions discussed with respect to the traction control component. Other activation conditions that activate an assistance component of a driver assistance system (e.g., legacy driver assistance system) during autonomous operation of the vehicle are contemplated.

As discussed, various aspects of the present disclosure are directed to maintaining an autonomous mode when an assistance component of a legacy driver assistance system is activated based on each false-positive activation condition of a set of false-positive activation conditions being satisfied. An example of maintaining the autonomous mode may be found in FIG. 2, which shows a flow diagram that illustrates an example of a process 200 for preventing unintended disengagement of the autonomous mode, in accordance with various aspects of the present disclosure. The process 200 may be performed by one or more components of an autonomous vehicle, such as the vehicle 100 described with reference to FIGS. 1A, 1B, and 3.

Figure 2:
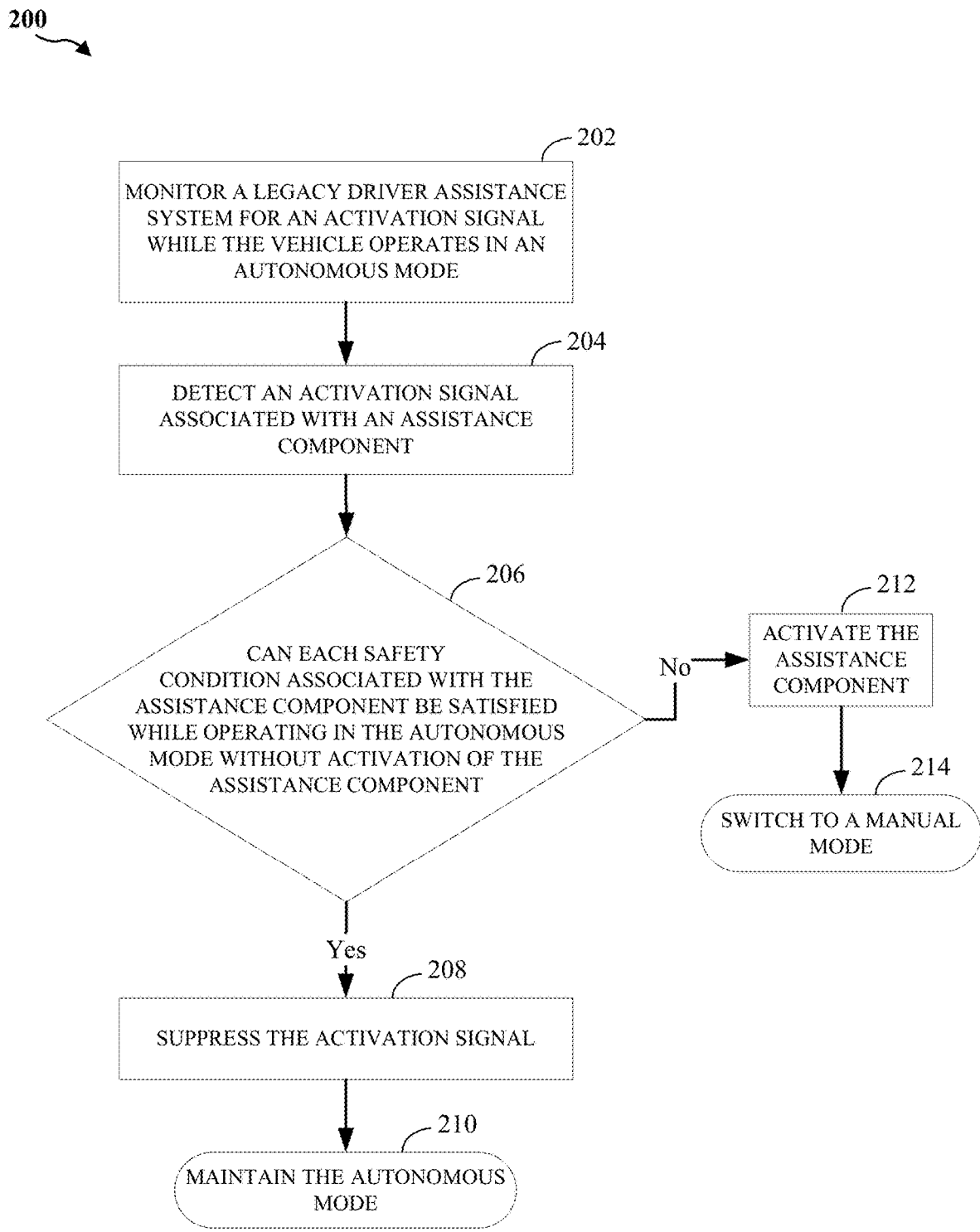
FIG. 2 is a flow diagram illustrating an example of a process for preventing unintended disengagement of an autonomous mode, in accordance with various aspects of the present disclosure.

In the example of FIG. 2, the vehicle 100 is retrofitted with an autonomous driving system to operate the vehicle 100 in an autonomous mode. In this example, because the vehicle 100 is retrofitted with the autonomous driving system, the vehicle 100 may include a legacy driver assistance system (e.g., OEM driver assistance system). Additionally, in the example of FIG. 2, the autonomous driving system may associate one or more false-positive activation conditions with each assistance component of the multiple assistance components associated with the legacy driver assistance system. The one or more assistance components may include, for example, a traction control component, an automatic braking component, an automatic cruise control component, a driver warning component, or another type of component. The one or more assistance conditions may be identified based on actions of a human driver that activate the associated assistance component and cause unnecessary disengagement of the autonomous mode based on the activation of the associated assistance component. The disengagement of the autonomous mode may be unnecessary when the activation of the assistance component does not improve safety and/or the vehicle may perform the functions associated with the assistance component while operating in the autonomous mode.

As shown in FIG. 2, at block 202, the process 200 may monitor a legacy driver assistance system for an activation signal while the vehicle operates in an autonomous mode. The legacy driver assistance system may include one or more hardware components and/or one or more software components for controlling the one or more assistance components. The process 200 may be integrated with hardware and/or software components of the vehicle 100 to monitor for an activation signal from the one or more hardware and/or software components of the legacy driver assistance system. Specifically, the process 200 may act as an intermediary between the legacy driver assistance system and each assistance component. Therefore, the process 200 may receive an activation signal generated by the legacy driver assistance system, wherein the activation signal is intended for an assistance component of one or more assistance components associated with the legacy driver assistance system.

At block 204, the process 200 may detect an activation signal based on the monitoring. Additionally, or alternatively, the process 200 may detect an assistance condition that triggers the activation signal. The activation signal for each assistance component may be generated by a legacy driver control system based on one or more different triggers (e.g., assistance conditions). As an example, an automatic braking component may be activated based on a distance between an object in front of the vehicle 100 and the vehicle 100 being less than a threshold. Based on detecting the activation signal corresponding to an assistance component, the process 200 may determine if each safety condition associated with the assistance component can be satisfied while operating in the autonomous mode without activation of the assistance component (block 206). Each assistance component may be associated with a set of different safety conditions. The set of safety conditions may include one or more different safety conditions.

Additionally, each assistance component may be associated with one or more different assistance conditions. As an example, for the traction control component, the set of assistance conditions may include a first condition that the vehicle moves from a standstill, a second condition that the steering wheel is at a particular angle or range of angles, such as equal to or greater than 200 degrees, and a third condition that the vehicle speed is less than a threshold, such as 14.4 km/h when moving from the standstill. In some such examples, a fourth condition may be specified that a traction control warning is activated for a specific time period, such as less than two seconds.

If the vehicle can satisfy the safety condition(s) associated with the assistance component while operating in the autonomous mode without activation of the assistance component, the process 200 suppresses the activation signal (block 208). Suppressing an activation signal may change a value of the activation signal. As an example, if the activation signal is a zero, masking the activation signal may cause the value to change to one or a floating-point value, such as 1.236. As shown in FIG. 2, by masking the activation signal, the autonomous driving system may maintain the autonomous mode (block 210).

Alternatively, as shown in FIG. 2, if the vehicle cannot satisfy the safety condition(s) associated with the assistance component while operating in the autonomous mode without activation of the assistance component at block 206, the process 200 does not suppress the activation signal. In such examples, the activation signal may activate the assistance component of the legacy driver assistance system (block 212). Additionally, activation of the assistance component causes the autonomous driving system to switch from the autonomous mode to a manual mode (block 214). That is, the autonomous driving system may disengage the autonomous mode based on activation of the assistance component associated with the legacy driver assistance system.

Figure 3:
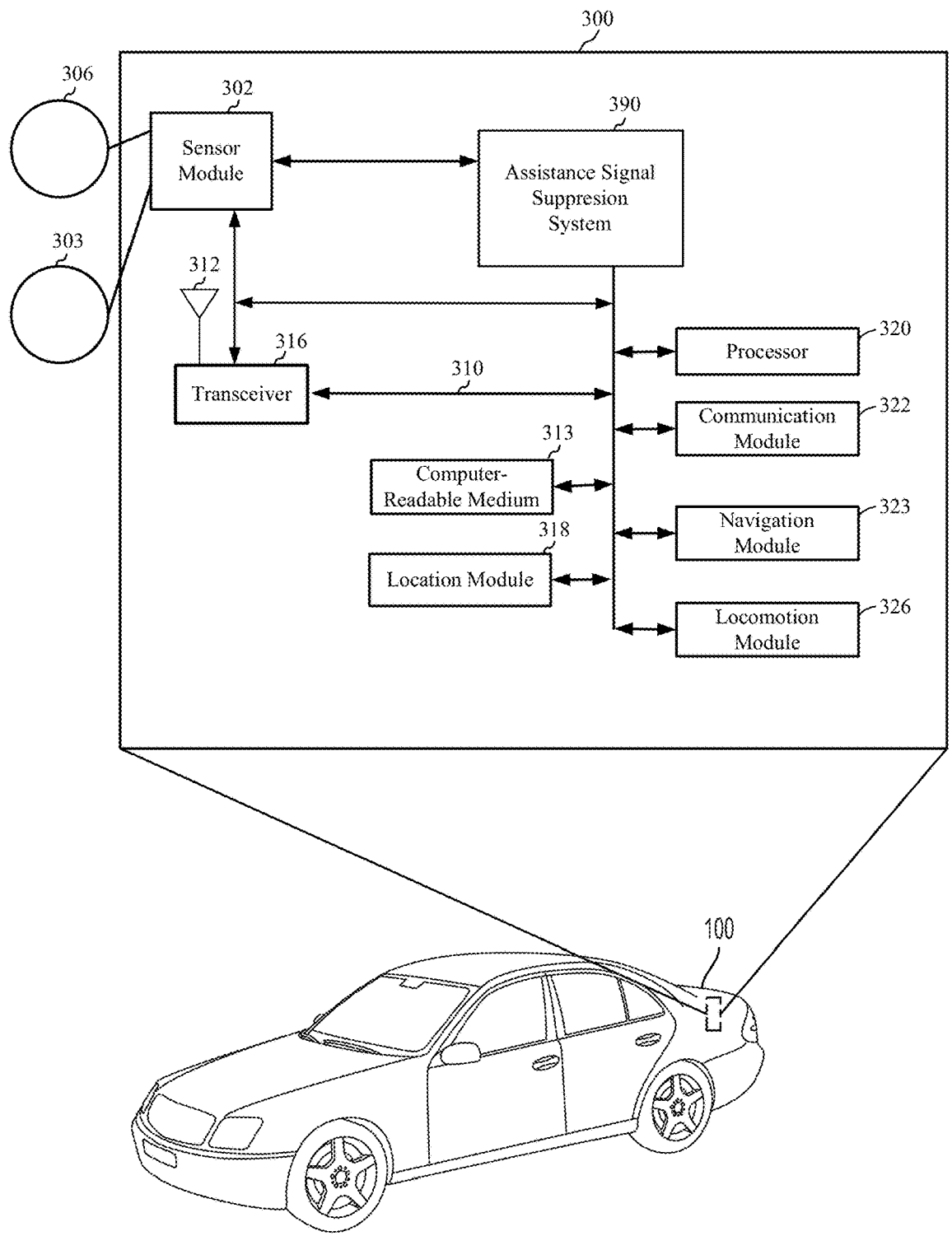
FIG. 3 is a diagram illustrating an example of a hardware implementation for a vehicle control system comprising an assistance signal suppression system, in accordance with aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include an assistance signal suppression system 390. In some examples, vehicle control system 300 is configured to perform operations, including operations of the processes 200 and 400 described with reference to FIGS. 2 and 4, respectively.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 326, a planning module 323, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 316 coupled to the processor 320, the sensor module 302, a comfort module 308, the communication module 322, the location module 318, the locomotion module 326, the planning module 323, and the computer-readable medium 313. The transceiver 316 is coupled to an antenna 333. The transceiver 316 communicates with various other devices over a transmission medium. For example, the transceiver 316 may receive commands via transmissions from a user or a remote device. As another example, the transceiver 316 may transmit driving statistics and information from the comfort module 308 to a server (not shown).

In one or more arrangements, one or more of the modules 302, 308, 313, 316, 318, 320, 322, 323, 326, 390, can include artificial or computational intelligence elements, such as, neural network, fuzzy logic or other machine learning algorithms. Further, in one or more arrangements, one or more of the modules 302, 308, 313, 316, 318, 320, 322, 323, 326, 390 can be distributed among multiple modules 302, 308, 313, 316, 318, 320, 322, 323, 326, 390 described herein. In one or more arrangements, two or more of the modules 302, 308, 313, 316, 318, 320, 322, 323, 326, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 328, or any of the modules 302, 308, 313, 316, 318, 320, 322, 323, 326, 390. The computer-readable medium 313 may also be used for storing data that is manipulated by the processor 320 when executing the software.

The sensor module 302 may be used to obtain measurements via different sensors, such as a first sensor 306 and a second sensor 303. The first sensor 306 and/or the second sensor 303 may be a vision sensor, such as a stereoscopic camera or a red-green-blue (RGB) camera, for capturing 2D images. Additionally, or alternatively, one or both of the first sensor 306 or the second sensor 303 may work in conjunction with the assistance signal masking system to determine if an activation condition is satisfied. The first sensor 306 and the second sensor 303 are not limited to vision sensors as other types of sensors, such as, for example, light detection and ranging (LIDAR), a radio detection and ranging (RADAR), sonar, and/or lasers are also contemplated for either of the sensors 303, 306. The measurements of the first sensor 306 and the second sensor 303 may be processed by one or more of the processor 320, the sensor module 302, the comfort module 308, the communication module 322, the location module 318, the locomotion module 326, the planning module 323, in conjunction with the computer-readable medium 313 to implement the functionality described herein. In one configuration, the data captured by the first sensor 306 and the second sensor 303 may be transmitted to an external device via the transceiver 316. The first sensor 306 and the second sensor 303 may be coupled to the vehicle 328 or may be in communication with the vehicle 328.

The location module 318 may be used to determine a location of the vehicle 328. For example, the location module 318 may use a global positioning system (GPS) to determine the location of the vehicle 328. The communication module 322 may be used to facilitate communications via the transceiver 316. For example, the communication module 322 may be configured to provide communication capabilities via different wireless protocols, such as WiFi, long term evolution (LTE), 3G, etc. The communication module 322 may also be used to communicate with other components of the vehicle 328 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 326 may be used to facilitate locomotion of the vehicle 328. As an example, the locomotion module 326 may control movement of the wheels. As another example, the locomotion module 326 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 323 for planning a route or controlling the locomotion of the vehicle 328, via the locomotion module 326. In one configuration, the planning module 323 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The assistance signal suppression system 390 may be in communication with the sensor module 302, the transceiver 316, the processor 320, the communication module 322, the location module 318, the locomotion module 326, the planning module 323, and the computer-readable medium 313. In some examples, working in conjunction with one or more of the sensors 303, 306 and/or the sensor module 302, the assistance signal suppression system 390 may detecting, while the vehicle 100 is operating in an autonomous mode, an assistance condition that triggers activation of an assistance component of a set of assistance components associated with a driver assistance system. Additionally, the assistance signal suppression system 390 may determine whether the operation of the vehicle in the autonomous mode satisfies a safety condition associated with the assistance component. That is, the assistance signal suppression system 390 may determine whether the autonomous driving system may safely operate the vehicle in view of the scenario that satisfied the assistance condition. Furthermore, the assistance signal suppression system 390 may adjust an activation signal that triggers the activation of the assistance component based on determining the operation of the vehicle in the autonomous mode satisfies the safety condition. Adjusting the activation signal may include suppressing or modifying the activation signal. In some examples, the assistance signal suppression system 390 may the vehicle 100 cannot satisfy the safety condition and switches from the autonomous mode to a manual mode based on determining the operation of the vehicle in the autonomous mode fails to satisfy the safety condition. In some implementations, the vehicle 100 is retrofitted to include an autonomous driving system that controls the autonomous mode.

Figure 4:
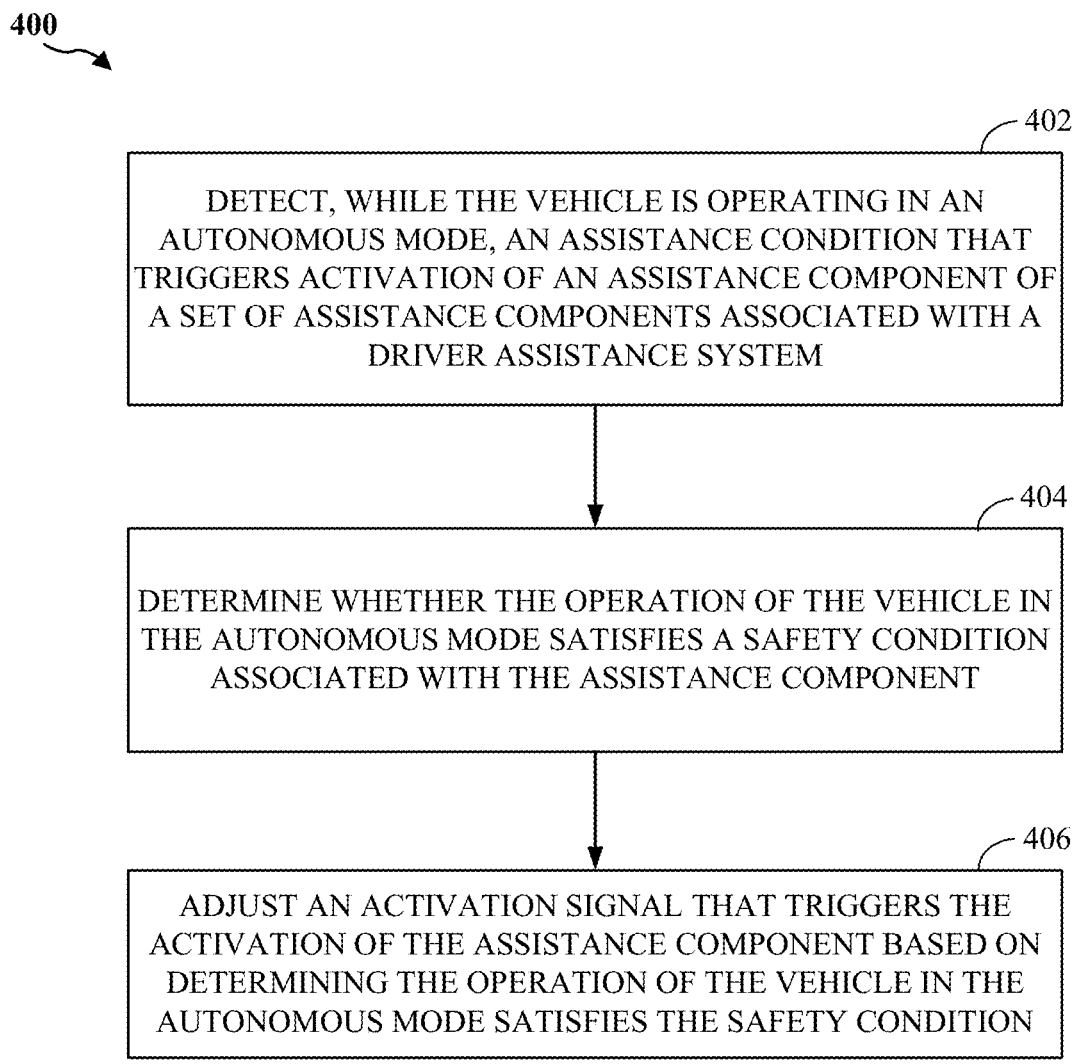
FIG. 4 illustrates a flow diagram for a process for preventing unintended disengagement of an autonomous mode, in accordance with aspects of the present disclosure.

FIG. 4 illustrates a flow diagram for a process 400 for controlling an acceleration rate of a vehicle, in accordance with aspects of the present disclosure. The vehicle may be an example of a vehicle 100 described with reference to FIGS. 1A, 1B, and 3. As shown in FIG. 4, the process 400 begins at block 402, by detecting, while the vehicle is operating in an autonomous mode, an assistance condition that triggers activation of an assistance component of a set of assistance components associated with a driver assistance system. Each assistance component may be activated when one or more assistance conditions are satisfied. Additionally, each assistance component of the set of assistance components is associated with one or more assistance conditions of a set of assistance conditions. Furthermore, each assistance condition of the set of assistance conditions may be learned from an action of a human driver that activates a respective assistance component of the set of assistance components. The set of assistance components include, for example, one or more of a stability control component (e.g., a traction control component or a vehicle stability component), a velocity control component (e.g., a braking component), a cruise control component (e.g., a dynamic cruise control component or an adaptive cruise control component), a lane assistance component (e.g., a lane keeping assistance component or a lane departure warning component), or a warning component (e.g., a driver warning component). At block 404, the process 400 determines whether the operation of the vehicle in the autonomous mode satisfies a safety condition associated with the assistance component. Each assistance component may be associated with one or more different safety conditions. At block 406, the process 400 adjusts an activation signal that triggers the activation of the assistance component based on determining the operation of the vehicle in the autonomous mode satisfies the safety condition. Alternatively, the process 400 may impose a preventive maneuver to satisfy the safety condition and may adjust the activation signal based on imposing the preventive maneuver. In some examples, the process 400 may maintain maintaining the autonomous mode based on adjusting the activation signal.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for managing autonomous operation of a vehicle, comprising:
   detecting, while the vehicle is operating in an autonomous driving mode, an assistance condition that triggers activation of an assistance component of a set of assistance components associated with a driver assistance system, the vehicle being operated without human intervention in the autonomous driving mode;
   determining whether the operation of the vehicle in the autonomous driving mode satisfies a safety condition associated with the assistance component; and
   adjusting an activation signal that triggers the activation of the assistance component based on determining the operation of the vehicle in the autonomous driving mode satisfies the safety condition.

2. The method of claim 1, further comprising maintaining the autonomous driving mode based on adjusting the activation signal.

3. The method of claim 1, further comprising:
determining the operation of the vehicle in the autonomous driving mode fails to satisfy the safety condition; and
switching from the autonomous driving mode to a manual driving mode based on determining the operation of the vehicle in the autonomous driving mode fails to satisfy the safety condition.

4. The method of claim 1, wherein the set of assistance components include one or more of a stability control component, a velocity control component, a cruise control component, a lane assistance component, or a warning component.

5. The method of claim 1, wherein the vehicle is retrofitted to include an autonomous driving system that controls the autonomous driving mode.

6. The method of claim 1, wherein:
each assistance component of the set of assistance components is associated with one or more assistance conditions of a set of assistance conditions; and
each assistance condition of the set of assistance conditions is learned from an action of a human driver that activates a respective assistance component of the set of assistance components.

7. The method of claim 1, wherein each assistance component is associated with a different safety condition.

8. An apparatus for managing autonomous operation of a vehicle, comprising:
at least one processor; and
at least one memory coupled with the at least one processor and storing instructions operable, when executed by the at least one processor, to cause the apparatus to:
detect, while the vehicle is operating in an autonomous driving mode, an assistance condition that triggers activation of an assistance component of a set of assistance components associated with a driver assistance system, the vehicle being operated without human intervention in the autonomous driving mode;
determine whether the operation of the vehicle in the autonomous driving mode satisfies a safety condition associated with the assistance component; and
adjust an activation signal that triggers the activation of the assistance component based on determining the operation of the vehicle in the autonomous driving mode satisfies the safety condition.

9. The apparatus of claim 8, wherein execution of the instructions further cause the apparatus to maintain the autonomous driving mode based on adjusting the activation signal.

10. The apparatus of claim 8, wherein execution of the instructions further cause the apparatus to:
determine the operation of the vehicle in the autonomous driving mode fails to satisfy the safety condition; and
switch from the autonomous driving mode to a manual driving mode based on determining the operation of the vehicle in the autonomous driving mode fails to satisfy the safety condition.

11. The apparatus of claim 8, wherein the set of assistance components include one or more of a stability control component, a velocity control component, a cruise control component, a lane assistance component, or a warning component.

12. The apparatus of claim 8, wherein the vehicle is retrofitted to include an autonomous driving system that controls the autonomous driving mode.

13. The apparatus of claim 8, wherein:
each assistance component of the set of assistance components is associated with one or more assistance conditions of a set of assistance conditions; and
each assistance condition of the set of assistance conditions is learned from an action of a human driver that activates a respective assistance component of the set of assistance components.

14. The apparatus of claim 8, wherein each assistance component is associated with a different safety condition.

15. A non-transitory computer-readable medium having program code recorded thereon for managing autonomous operation of a vehicle, the program code executed by at least one processor and comprising:
program code to detect, while the vehicle is operating in an autonomous driving mode, an assistance condition that triggers activation of an assistance component of a set of assistance components associated with a driver assistance system, the vehicle being operated without human intervention in the autonomous driving mode;
program code to determine whether the operation of the vehicle in the autonomous driving mode satisfies a safety condition associated with the assistance component; and
program code to adjust an activation signal that triggers the activation of the assistance component based on determining the operation of the vehicle in the autonomous driving mode satisfies the safety condition.

16. The non-transitory computer-readable medium of claim 15, wherein the program code further comprises program code to maintain the autonomous driving mode based on adjusting the activation signal.

17. The non-transitory computer-readable medium of claim 15, wherein the program code further comprises:
program code to determine the operation of the vehicle in the autonomous driving mode fails to satisfy the safety condition; and
program code to switch from the autonomous driving mode to a manual driving mode based on determining the operation of the vehicle in the autonomous driving mode fails to satisfy the safety condition.

18. The non-transitory computer-readable medium of claim 15, wherein the set of assistance components include one or more of a stability control component, a velocity control component, a cruise control component, a lane assistance component, or a warning component.

19. The non-transitory computer-readable medium of claim 15, wherein the vehicle is retrofitted to include an autonomous driving system that controls the autonomous driving mode.

20. The non-transitory computer-readable medium of claim 15, wherein:
each assistance component of the set of assistance components is associated with one or more assistance conditions of a set of assistance conditions; and
each assistance condition of the set of assistance conditions is learned from an action of a human driver that activates a respective assistance component of the set of assistance components.

* * * * *